United States Patent Office 2,814,634
Patented Nov. 26, 1957

2,814,634

PROCESS OF MAKING SILICATES

Ettore Da Fano, Downey, Calif., assignor to John B. Pierce Foundation, New York, N. Y., a corporation of New York No Drawing. Application October 16, 1952,
Serial No. 315,208

5 Claims. (Cl. 260—448.8)

This invention relates to the production of organic silicates.

Esters of orthosilicic and polysilicic acids as known to the art are prepared by treating a silicon chloride or a silicon oxychloride with alcohols or phenols. Other methods for preparing these esters include the transesterification with alcohols or phenols of esters made by the above method.

Alkyl and aryl silicates prepared according to these methods, either in the form of pure compounds or mixtures, have been proposed for use as heat transfer media for high temperature, hydraulic fluids, lubricants, plasticizers and for other uses where high fluidity, high boiling points and low pour points are essential. They may be tetra-aryl, tetra-alkyl, mixed tetra-aryl, mixed tetra-alkyl or mixed alkyl-aryl silicates. Examples of the production of tetra-aryl orthosilicates by the reaction of silicon tetrachloride with a phenolic compound may be found in U. S. Patent No. 2,335,012 to Johnston. The same patent discloses mixtures of tetra-aryl and tetra-alkyl orthosilicates, for example, a mixture of tetra-phenyl and tetra-ethyl orthosilicates. In U. S. Patent No. 2,584,334 to the present applicant, there is disclosed mixtures of various tetra-aryl orthosilicates, for example, a mixture of tetra-phenyl orthosilicate, diphenyl orthosilicate, and mixed phenyl-diphenyl orthosilicates. In the applicant's co-pending application Ser. No. 108,430, filed August 3, 1949, now U. S. Patent 2,641,581 there is disclosed mixtures of alkyl-aryl silicates such as isopropyl-phenyl orthosilicates which may be prepared by reacting silicon tetrachloride with a mixture of phenol and isopropyl alcohol.

It is known that high purity of such silicates is essential for their satisfactory performance in the uses specified above. Impurities contained in the silicates generally diminish their thermal stability and make them unfit for use as heat transfer media. They also strongly increase the natural tendency of silicates to hydrolyze in the presence of water and form low-boiling reaction products on the one hand and highly viscous or even solid products on the other hand.

The impurities contained in the silicates derive in part from impurities in the phenols and alcohols which are used in their manufacture, being those impurities which cannot be removed effciently from commercial phenols and alcohols by a simple distillation process as they co-distill with the main material. When the phenols or alcohols are reacted with a silicon chloride or used in the transesterification process in the production of silicates, the impurities contained in them frequently undergo reactions resulting in their conversion to high molecular weight, dark colored substances. In part they react with silicon tetrachloride forming complex silicates, and in part they condense under the effect of the anhydrous hydrogen chloride that is copiously given off in the course of the main reaction. Furthermore, it is extremely difficult to carry the esterification to completion and, therefore, some chlorosilicates are always contained in the reaction product as impurities, being generally as undesirable as those introduced with the phenols and alcohols.

The commercial way of purifying silicates is to distill them usually in vacuum. This process is in most cases an expensive one because of the high boiling points of the silicates. In some cases they cannot be distilled at all without series decomposition; this is the case with polysilicates and with esters of higher phenols, such as phenylphenol. But even in those cases where distillation is possible, a sufficient purification can not always be achieved because some of the impurities co-distill with the main fraction. Purification of the finished silicates by treatment with activated charcoal does not lead to satisfactory results either, and in some cases, treatment of the silicate with charcoal actually deteriorates the liquid and enhances some of its undesirable properties.

In accordance with this invention it has been found that the above-described silicates can be obtained with a high degree of purity if the reaction of alcohols or phenols or mixtures thereof with either silicon chlorides, silicon oxychlorides, or silicate esters is carried in the presence of relatively small amounts of a finely-divided adsorbent such as activated carbon, silica gel, activated clay or fuller's earth. The finely-divided adsorbent is added to the reaction mixture preferably before the reaction is started, although in certain cases it may be added after the reaction has started but before the reaction is completed. The minimum amount of adsorbent required for best results varies according to the case, but it is usually from 0.2 to 3.0% based on the weight of reactants. It is to be understood that the percentages given refer only to the minimum amount of adsorbent that may be required and that there is no upper limit on the amount of adsorbent that may be used, the upper limit being primarily an economical consideration.

The preferred adsorbent for the practice of this invention is activated carbon which includes activated charcoal. Such materials may be made by a number of different commercial processes, for instance, by subjecting carbonaceous matters of high density and stone-cell structure to a process of distillation at above 700° C. and then submitting the residual product to the action of steam or oxidizing gas while still hot. Other commercial methods of activating carbon include heating in vacuum at an elevated temperature and the treatment of carbonaceous matter with solutions of certain salts, reheating, washing and purifying the resultant carbon. The various types of activated carbons include "Acticarbone" (prepared from wood charcoal), "Darco" (prepared from lignite) and "Darsite" (prepared from coconut shells). Other activated carbons include those sold under the trade names "Karbos," "Norit" and "Carbrox."

It is believed that the activated carbon does not act merely as an adsorbent removing the final impurities, but that it also acts on the intermediate reaction products of the impurities and removes them from solution before they are converted into final reaction products which could no longer be effectively adsorbed by the carbon.

The addition of the adsorbent to the reaction mixture must be made before the formation of final, high molecular weight impurities. This means that the adsorbent must be added either at the beginning of the reaction or close to the beginning of the reaction. Thus the process of this invention distinguishes itself from known processes in which a finely-divided adsorbent is added to the reaction mass at the completion of the reaction. In the latter instance, the degree of purity obtained is not nearly as high as that obtained by the process of this invention.

It has been found that the heat stability of silicates prepared in the described manner is equal to and in some cases superior to that of the distilled silicates. It has also been found that silicates prepared in the presence of a finely-divided adsorbent possesses substantially increased resistance to hydrolysis, to oxidation and to the catalytic action of metals such as iron and aluminum. Furthermore, the silicates prepared according to this invention are clear, colorless, or only slightly colored.

In order to illustrate this invention and the advantages thereof, the following examples are given. Parts are by weight unless otherwise specified.

*Example 1*

Into a reaction vessel equipped with a thermometer and reflux condenser there is placed 200 parts of phenol. The phenol is heated to a temperature of approximately 50° C. and 2 parts of activated carbon known as "Darco" are added. There is then added very gradually 60 parts of silicon chloride while agitating the mixture and holding the temperature at 50° C. The resultant mixture is allowed to stand for several hours and the temperature is then raised gradually to 230° C. during which time the reaction is completed. The reaction product is then boiled gently solely for the purpose of removing excess unreacted phenol and the activated carbon is removed from the product by filtration. The tetra-phenyl orthosilicate thus prepared is at least equal to and in some cases better with respect to resistance to hydrolysis, to decomposition by heat and to the catalytic action of metals such as iron and aluminum, than a tetra-phenyl orthosilicate prepared without the adsorbent and purified by distillation. It is superior to the same product prepared in the same way but without the activated carbon, and then treated subsequently with the same amount of activated carbon.

*Example 2*

A mixture of 94 parts of phenol and 169 parts of orthophenylphenol is charged into a reaction vessel equipped with a reflux condenser, thermometer and a drying tower. Eighty-five (85) parts of silicon tetrachloride and 3% of activated carbon based on the weight of reactants are then added to the mixture of phenols and the reaction mixture is raised slowly to about 230° C. to expel all hydrochloric acid. The reaction mixture is then allowed to reflux for about 12 hours at 260° C. to complete the reaction. The condenser is then arranged for distillation and the unreacted phenolic compounds are stripped off by gently boiling the product. The activated carbon is removed by filtering the product. The resultant mixture of phenyl-diphenyl orthosilicates is at least equal in purity to similar mixtures prepared in the absence of activated carbon and purified by distillation.

*Example 3*

Into a reaction vessel equipped with a thermometer, reflux condenser and drying tower is charged a mixture of 2.0 mols of isopropyl alcohol and 2.0 mols of phenol. To this mixture there is added 1 mol of silicon tetrachloride and 0.2% by weight of the reactants of activated carbon. The reaction mixture is raised slowly over a period of several hours to its reflux temperature and reflux is continued for several additional hours. At the end of this time, the excess unreacted phenol and isopropyl alcohol are stripped from the reaction product and the activated carbon is removed by filtration. The resultant product is almost completely free from impurities and is comparable with a similar product prepared without the activated carbon and later purified by distillation.

*Example 3A*

The procedure of Example 3 is followed with the exception that the activated carbon is omitted from the reaction mixture. However, after the reaction is complete, 0.2% by weight of activated carbon is slurried with the reaction product, refluxed for several hours and later removed by filtration. The product obtained in this fashion is much darker in color than the product of Example 3 and contains many more impurities.

In the above examples the silicon chloride compound is the tetrachloride. Other chlorides such as hydrocarbon substituted chlorides containing 1 to 3 chlorines attached to the silicon behave similarly when reacted with the phenols or alcohols because the reaction to substitute the alkoxy or aroxy group for chlorine is the same. Such compounds may therefore be used in place of the tetrachloride. When the silicon compound is an ester the activated carbon similarly may be used. For example 1 mol of tetra-ethyl silicate, 1% based on the weight of reactants of activated carbon and 2 mols of amyl alcohol may be heated under reflux until 2 mols of ethyl alcohol are removed. The compound formed is diethyldiamyl silicate and because it was prepared in the presence of activated carbon, it is a superior product.

Where it is indicated herein and in the appended claims that the adsorbent is separated from the product by filtration, it is intended to include equivalent physical methods as distinguished from physical chemical methods of separation such as distillation. It is intended to cover all changes and modifications in the examples of this invention herein given for purposes of disclosure which do not constitute departure from the spirit and scope of the appended claims.

I claim:

1. In a process of making an organic silicate wherein a compound having the formula ROH, where R is selected from the group consisting of aryl and alkyl radicals, is reacted with a silicon compound having a replaceable radical selected from the group consisting of chlorine and hydrocarbinoxy radicals to link the R group to the silicon through oxygen, the improvement which comprises performing the reaction in the presence of activated carbon.

2. The process according to claim 1 wherein the silicon compound is a silicon chloride.

3. The process according to claim 1 in which the silicon compound is a silicon oxychloride.

4. A process of making a phenyl orthosilicate which comprises reacting phenol and silicon tetrachloride in the presence of activated carbon.

5. In a process of transesterifying an organic silicate wherein a compound having the formula ROH, where R is selected from the group consisting of aryl and alkyl radicals, is reacted with a silicate ester, the improvement which comprises performing the reaction in the presence of finely divided activated carbon.

References Cited in the file of this patent

UNITED STATES PATENTS

| | | |
|---|---|---|
| 2,058,844 | Vaughn | Oct. 27, 1936 |
| 2,276,094 | Rothrock | Mar. 10, 1942 |
| 2,438,379 | Archibald | Mar. 29, 1948 |
| 2,624,749 | Bunnell | Jan. 6, 1953 |

OTHER REFERENCES

Mantell: "Adsorption" (1945), pages 317 and 318, McGraw-Hill publishers, N. Y.

UNITED STATES PATENT OFFICE

CERTIFICATE OF CORRECTION

Patent No. 2,814,634

November 26, 1957

Ettore Da Fano

It is hereby certified that error appears in the above numbered patent requiring correction and that the said Letters Patent should read as corrected below.

In the heading to the printed specification, between lines 7 and 8, insert the following:

Claims priority, application Great Britain February 26, 1952

In the printed specification, column 2, line 7, for "series" read --serious--; column 4, line 25, beginning with "Where it is" strike out all to and including "as distillation." in line 29, same column.

Signed and sealed this 21st day of January 1958.

(SEAL)
Attest:

KARL H. AXLINE

Attesting Officer

ROBERT C. WATSON
Commissioner of Patents